M. E. TUCKER.
STRAWBERRY RUNNER CUTTER.
APPLICATION FILED NOV. 3, 1911.
1,064,790.
Patented June 17, 1913.
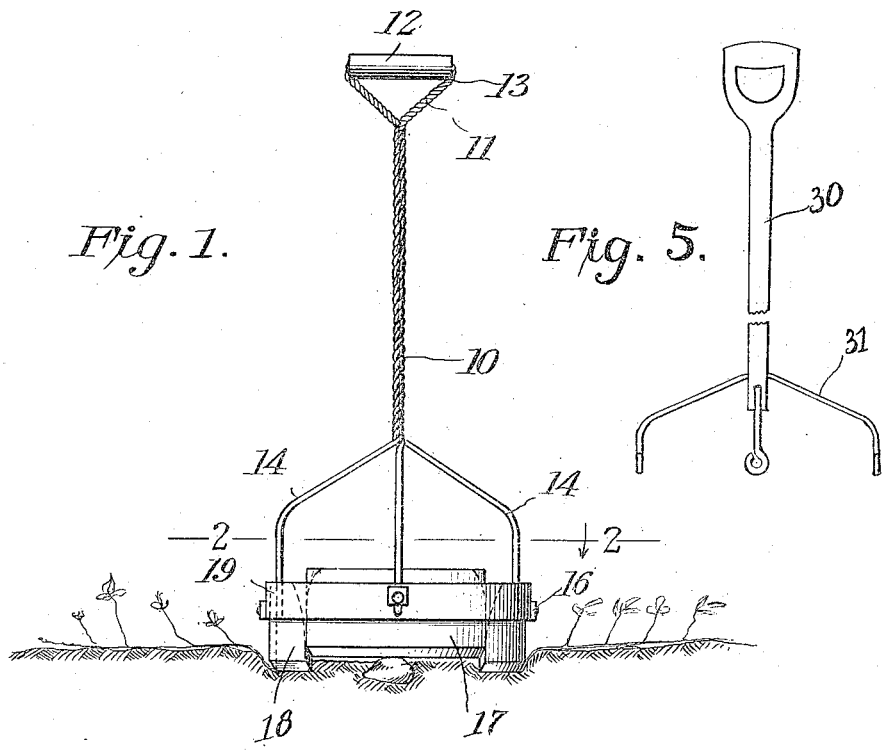
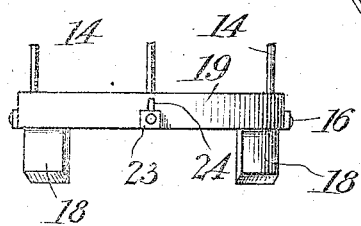
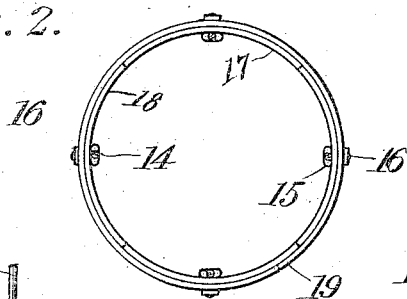
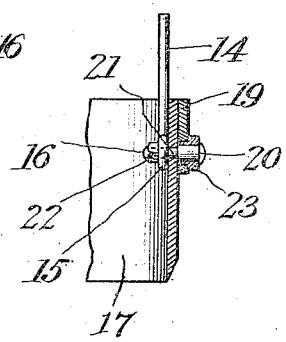
WITNESSES
INVENTOR
Mary E. Tucker
By H. S. Woodward, Attorney

UNITED STATES PATENT OFFICE.

MARY E. TUCKER, OF SWEET, IDAHO.

STRAWBERRY-RUNNER CUTTER.

1,064,790.

Specification of Letters Patent.   Patented June 17, 1913.

Application filed November 3, 1911.   Serial No. 658,396.

*To all whom it may concern:*

Be it known that I, MARY E. TUCKER, a citizen of the United States, residing at Sweet, in the county of Boise and State of Idaho, have invented new and useful Improvements in Strawberry-Runner Cutters, of which the following is a specification.

This invention relates to garden implements, and more particularly to trimmers for running strawberry vines, and the like.

It has for an object to provide a device usable to trim the plants all around a central root at one operation, but which may be arranged to trim them only on two sides at such times as that treatment is advisable, whereby the proximal runners of plants in a given line will be left to intermingle and form a continuous row of foliage.

It is also an object to present a trimmer of such construction that the desired degree of trimming of a plant will be efficiently performed in one stroke of the implement, without likelihood that unevenness in the ground surface around the plant will prevent its complete operation.

A further object is to present an economical construction of such a device, involving few operations in manufacture, and these of a simple nature, and also which construction involves the use of readily available material not requiring special type of machinery for its production.

Other objects and advantages will be apparent from the following description and from the drawings, in which—

Figure 1 is a side view of the device in operation showing an obstructing clod of earth engaging one of the blades adjacent one side. Fig. 2 is a bottom view of the device, Fig. 3 is a fragmentary sectional view showing the attachment of the blades, Fig. 4 is a side view showing two blades detached for row trimming, Fig. 5 is a modification of handle construction.

There is illustrated a trimmer comprising a handle shank 10, comprising two strands of heavy wire or metal rod material bent in parallel at their middle portions to form the loops 11, commonly engaged at their central portions through the tubular handle 12. As it is undesirable for the handle of such a device to rotate, the handle is provided at each end with notches 13 on one side of its axis, the side portions of the wire loops being disposed snugly therein. The end portions of the wires are twisted spirally together forming a heavy shank 10 of about the length of the handle shank of a spade, and at the lower end of this are curved radially outward and extended downwardly forming arms their outer ends directed vertically downwardly some distance and shaped into eyes 15 for the reception of bolts 16 securing the arms to blades 18 and 17. The blades are in the form of cylinder segments having abutting ends and disposed concentrically of a vertical axis coincident with that of the shank 10. The lower edges of the blades are sharpened and disposed normally in a common plane at right angles to the axis mentioned. When all the blades are in place an approximately continuous circular cutting edge is thus presented.

Two diametrically opposed blades 18 are secured pivotally to a heavy annular guide frame or ring 19, by means of bolts 20 having enlarged outer portions engaged revolubly through the ring and provided with suitable heads 20 engaging against the outer face of the ring. The blades are secured firmly to the reduced portions 21 of the bolts and against respective arms 14 through the eyes of which the reduced portions of the bolts project, inwardly of the blades, by means of bolt nuts 22. The ring 19 is thus held loosely between the blade and bolt head.

The intermediate blades 17 are engaged in a similar manner with the vertically slidable guide blocks 23 slidable in respective vertical slots 24 in the ring 19 at opposite points. The blocks are T-shaped in horizontal section and the heads of the bolts 16 securing the blades thereto engage against their outer surfaces. It will be apparent that the blades 17, are movable vertically with respect to the ring 19, as well as pivotally. The ring 19 and blades may together be termed a work head carried by the handle.

In use, it will be apparent that the blades will be held yieldably in position with their cutting edges in a horizontal plane, and when it is desired to trim the runners of a plant, the trimmer is positioned axially above the head stalk of the plant, and brought forcibly downward until the knives strike the runners, bearing them against the ground surface and cutting them off. It is preferable that the blades 17 be disposed at the sides of the furrow or row. Thus, by reason of the resiliency of the arms 14, if the knives 18 engage a high portion of the furrow they may be borne slightly upward, while the weight of the ring 19 and the weight of the blades 18 will carry the latter downward bending the supporting arms of the blades 17 slightly, until they engage the runners on the side of the furrow. The resiliency of the arms 14 also allows each knife to accommodate itself to a ground surface inclined with respect to their edges, so that one end may extend lower than the other if necessary. To facilitate this action the end edges may be rounded inward from their cutting edges, if desired as indicated by dotted lines in Fig. 1. Such movement of the blades might not be required where the ground is well cultivated and soft, but where the surface has hardened somewhat or the earth become packed, the action provided for is of great value.

When cutting completely around plants planted along a furrow or elongated hill, it will of course be apparent that the knives operating between the plants in the row will engage a ground surface of higher elevation than will those knives operating on the sides of the row, and it is very desirable that the knives be not prevented from performing their function at the sides by being held too high.

In Fig. 5 there is shown a modification of the handle construction in which a solid wooden handle 30 is provided, having a grip 31, and similar to the handles of spades and short hay forks. To the bottom portion of this handle four strips of iron 32 are secured bent into ogee shape and disposed in respective radial planes, and secured at their outer ends to the blades 17 and 18 as are the arms 14.

What is claimed is:

1. A device of the class described, comprising a vertical handle, a plurality of radial arms carried thereby, an annular head carried thereby including a plurality of concentric trimming blades, certain of the blades being removable to form opposed openings to receive plant portions without cutting thereof, for the formation of a row of foliage as described.

2. In a garden implement of the class described, a handle formed of a plurality of metal strands bent angularly at their middle parts to form a handle loop, their intermediate end portions being intertwined to form a rigid handle shank, their outer end portions being extended laterally and divergently for resilient movement longitudinally of the shank, and an annular trimmer device including blade sections carried respectively on the extremities of the arms.

3. A trimmer comprising a handle, a plurality of resilient metal strands carried thereby having their outer end portions curved outwardly and then downwardly in respective radial planes to form resilient arms, and a trimmer device carried at their extremities comprising an annulus, bolt elements movable therein and blade sections secured to the bolts and arms.

4. A trimmer comprising a handle, a plurality of resilient radial arms carried at the lower end thereof, the arms having apertured end portions, an annulus, bolts carried by certain of the arms engaged through the annulus and concentric blade members secured pivotally to the annulus by the bolts.

5. A trimmer comprising a handle, a plurality of resilient metal strands carried thereby having their outer end portions curved outwardly and then downwardly in respective radial planes, an annulus, bolt members movable therein and engaged with the arms, blade sections secured to the bolts and arms, certain of said bolts being pivoted in the annulus, the annulus having vertical slots intermediately of the pivoted bolts, other of said bolts being slidably held in the slots.

6. A device of the class described comprising a handle having a plurality of radial resilient arms, an annulus carried thereby, concentrically arranged cutter blades carried by respective arms, certain of the blades at opposed sides of the annulus being secured pivotally thereto and rigidly to respective arms, certain intermediate blades being engaged pivotally and vertically slidable on the annulus and connected rigidly to respective arms, whereby the blades will be held normally with their cutting edges in a common plane yieldably for adaptation to inclinations of a ground surface as described.

In testimony whereof I have hereunto set my hand in presence of two subscribing witnesses.

MARY E. TUCKER.

Witnesses:
Mrs. Wm. Talley,
Wm. Talley.